(12) United States Patent
Sampson et al.

(10) Patent No.: US 9,396,058 B2
(45) Date of Patent: *Jul. 19, 2016

(54) ENHANCED ERROR DETECTION WITH BEHAVIOR PROFILES

(71) Applicant: Bank of America Corporation, Charlotte, NC (US)

(72) Inventors: John R. Sampson, Charlotte, NC (US); David L. Yommer, Rock Hill, SC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/013,703

(22) Filed: Feb. 2, 2016

(65) Prior Publication Data

US 2016/0154691 A1 Jun. 2, 2016

Related U.S. Application Data

(63) Continuation of application No. 13/932,813, filed on Jul. 1, 2013, now Pat. No. 9,286,149.

(51) Int. Cl.
*G06F 11/07* (2006.01)

(52) U.S. Cl.
CPC ............ *G06F 11/079* (2013.01); *G06F 11/076* (2013.01); *G06F 11/0709* (2013.01); *G06F 11/0772* (2013.01); *G06F 11/0787* (2013.01)

(58) Field of Classification Search
CPC . G06F 21/316; G06F 21/554; H04L 63/1416; H04L 67/22
See application file for complete search history.

(56) References Cited

U.S. PATENT DOCUMENTS

| | | |
|---|---|---|
| 2003/0023715 A1 | 1/2003 | Reiner et al. |
| 2007/0240215 A1 | 10/2007 | Flores et al. |
| 2011/0225644 A1 | 9/2011 | Pullikottil et al. |
| 2013/0305357 A1* | 11/2013 | Ayyagari ............... H04L 63/14 726/22 |

\* cited by examiner

*Primary Examiner* — Jigar Patel
(74) *Attorney, Agent, or Firm* — Banner & Witcoff, Ltd.; Michael A. Springs

(57) ABSTRACT

Methods, systems, and computer-readable media for detecting errors within a system by using behavior profiles are presented. At a first time, user requests may be received and serviced. The serviced user requests may be logged. Based on the logged user requests, profiles may be determined. At a second time, user requests may be received and serviced. The serviced user requests may be logged. The logged serviced user requests may be compared to the profiles determined at a first time. For example, the determined profiles may include an error rate for serviced user requests. At the second time, an error rate for the logged serviced user requests may be compared to an error rate included the determined profiles. Serviced users requests may be flagged based on the comparison.

14 Claims, 11 Drawing Sheets

Application 2, Channel 1, Service 3

| Parameters |
|---|
| Para 1 |
| Para 1, Para 2 |
| Para 1, Para 2, Para 3 |
| Para 3 |
| Para 3, Para 4 |

| Error Name | Count | % |
|---|---|---|
| Invalid Para 1 | 10 | 1% |
| Invalid Para 2 | 10 | 1% |

Fig. 4

ENHANCED ERROR DETECTION WITH BEHAVIOR PROFILES

This application is a continuation of U.S. patent application Ser. No. 13/932,813, filed Jul. 1, 2013, which is incorporated by reference in its entirety herein.

TECHNICAL FIELD

Aspects of the disclosure relate to computer hardware and software. In particular, one or more aspects of the disclosure generally relate to computer hardware and software that can be used to detect system errors with behavior profiles, such as systems and methods for detecting errors based on changes in behavior with regard to how a web service interacts with computing devices

BACKGROUND

Large companies have become more complex and require a number of separate systems to communicate. As a result, computing devices are being required to interact with more systems in order to accomplish their assigned functionality. For instance, a web service that implements an application programming interface (API) may receive requests from a number of different entities. As a result, a change in the web service or in one of the entities that issues the web service requests may cause an increase in errors and may reduce efficiency. Accordingly, there is a need for systems and method addressing one or more of these shortcomings.

SUMMARY

Aspects of the disclosure provide various techniques that enable detecting errors within a system by using behavior profiles.

Methods, systems, and computer-readable media for detecting errors within a system are described according to an embodiment. At a first time, user requests may be received and serviced. The serviced user requests may be logged. Based on the logged user requests, profiles may be determined. At a second time, user requests may be received and serviced. The serviced user requests may be logged. The logged serviced user requests may be compared to the profiles determined at a first time. For example, the determined profiles may include an error rate for serviced user requests. At the second time, an error rate for the logged serviced user requests may be compared to an error rate included the determined profiles. Serviced user requests may be flagged based on the comparison.

In an embodiment, the user requests may comprise application programming interface (API) calls. The user requests may include parameters passed in an API call. Serviced user requests may be grouped based on the parameters passed in an API call. In an embodiment, profiles may be determined for the API calls grouped together based on the parameters passed in an API call. The profiles may include an error rate for the grouped API calls.

In an embodiment, at the second time, the logged serviced user requests may comprise API calls. The user requests may include parameters passed in an API call. The logged API calls may be grouped based on the parameters they pass in the API call. The logged grouped API calls may include an error rate. In an embodiment, an error rate for the logged grouped API calls may be compared against and error rate for a determined profile. A group of API calls may be flagged based on the comparison.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 4 illustrates an example profile according to an embodiment.

DETAILED DESCRIPTION

In the following description of various embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate detecting errors within a system by using behavior profiles. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
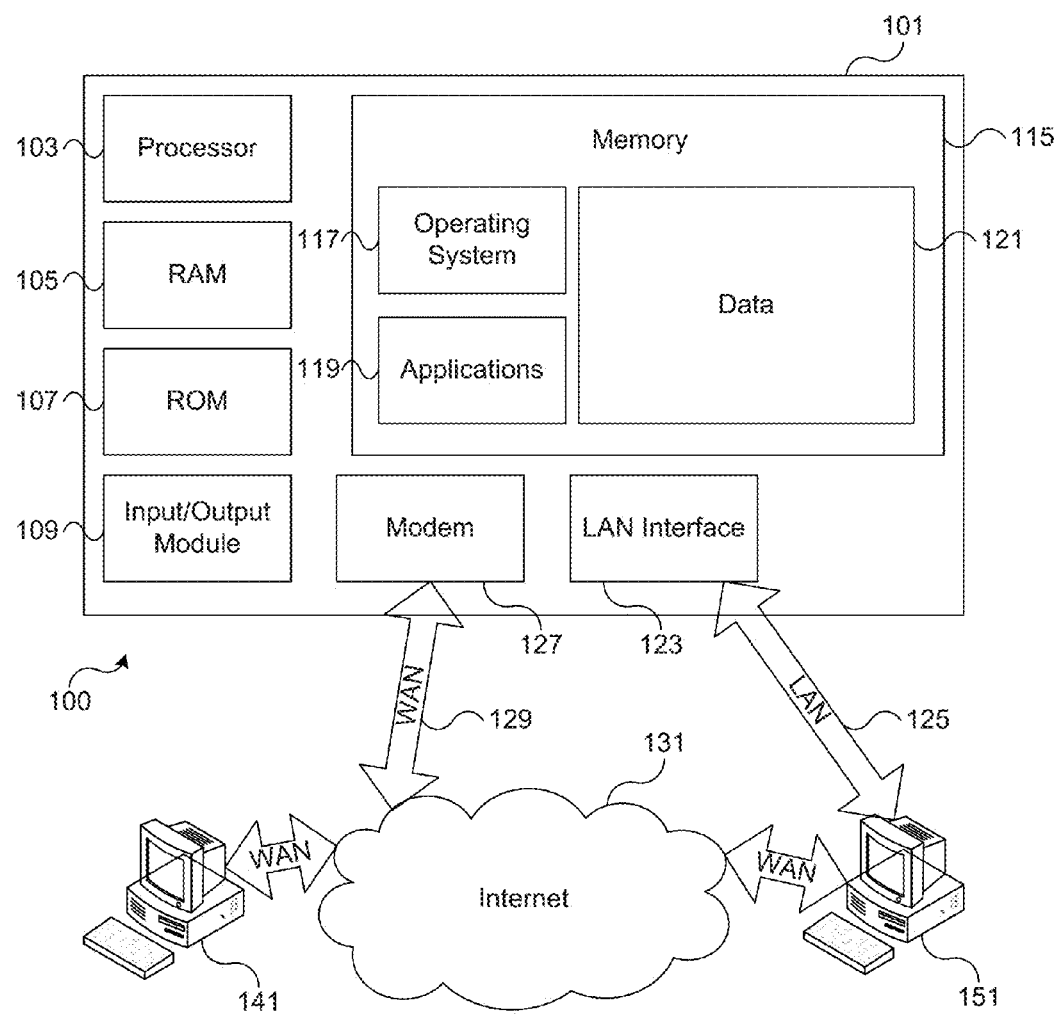
FIG. 1A illustrates an example operating environment according to an embodiment.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
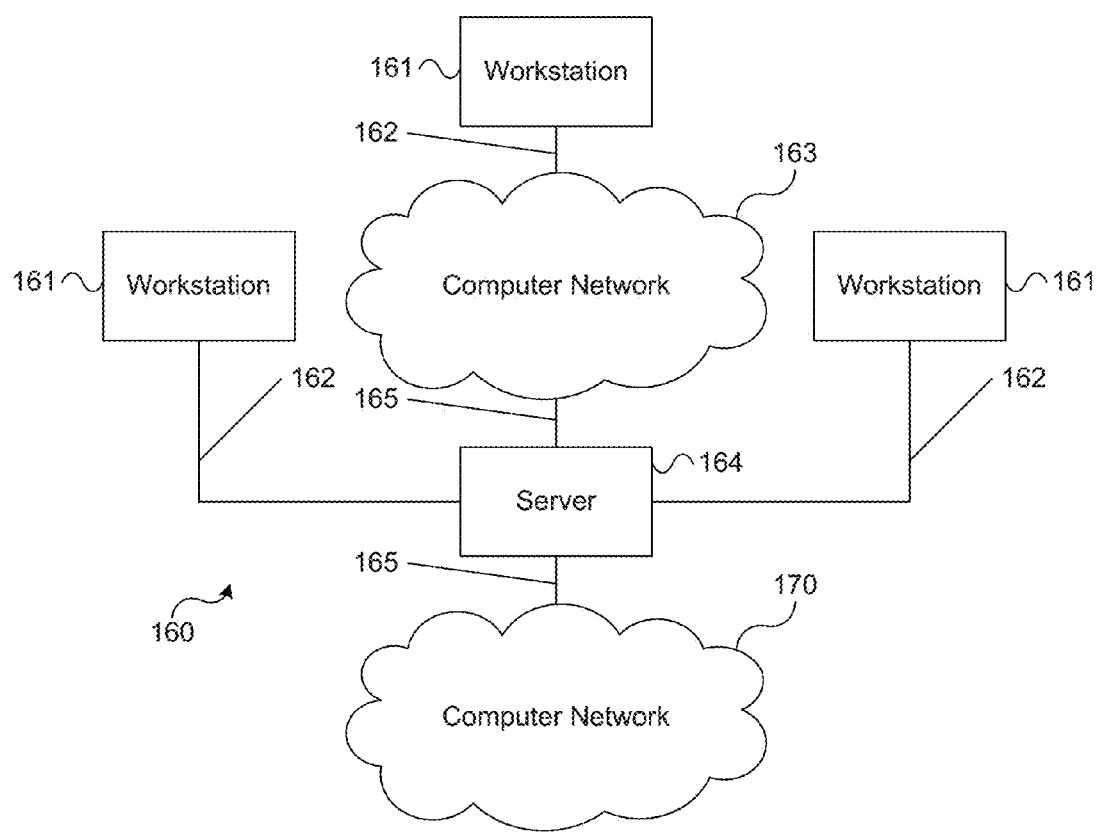
FIG. 1B illustrates another example operating environment according to an embodiment.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

In an embodiment, an organization, such as a bank or a financial institution, may service user requests from a user computing device. For example, a bank may service user requests generated at a computing device and routed to a bank computing device through a network, for example the Internet. User requests may be generated by entities that work with the organization, divisions within the organization, or individuals, such as bank customers. These requests may include user requests to electronically manage a customer account with the bank, to access electronic information, or any other suitable request.

In an embodiment, server 164 of FIG. 1B may comprise a web server that services user requests for a financial institution and workstation 161 of FIG. 1B may comprise a user computing device for generating the request. Server 163 may implement an application programming interface (API) that specifies a format for user requests. In an example, the API may specify a format for looking up a bank customer. The API may allow for look ups using the following parameters: a first name and last name; a social security number; a last name and address; and any other suitable format. A user request may comprise an API call to look up a bank customer, and the user request may take the form of one or more formats specified by the API. In an embodiment, the API may specify a format for any suitable user request.

In an embodiment, a user request may be serviced by the organization, such as by server 164 of FIG. 1B, based on the format. For example, if a user request is not formatted according to the API specification, an error may be generated and the user request may not be completed. In another example, a user request may be formatted according to an API format, and the user request may be completed. These serviced user requests may be logged as a user transaction.

Figure 2:
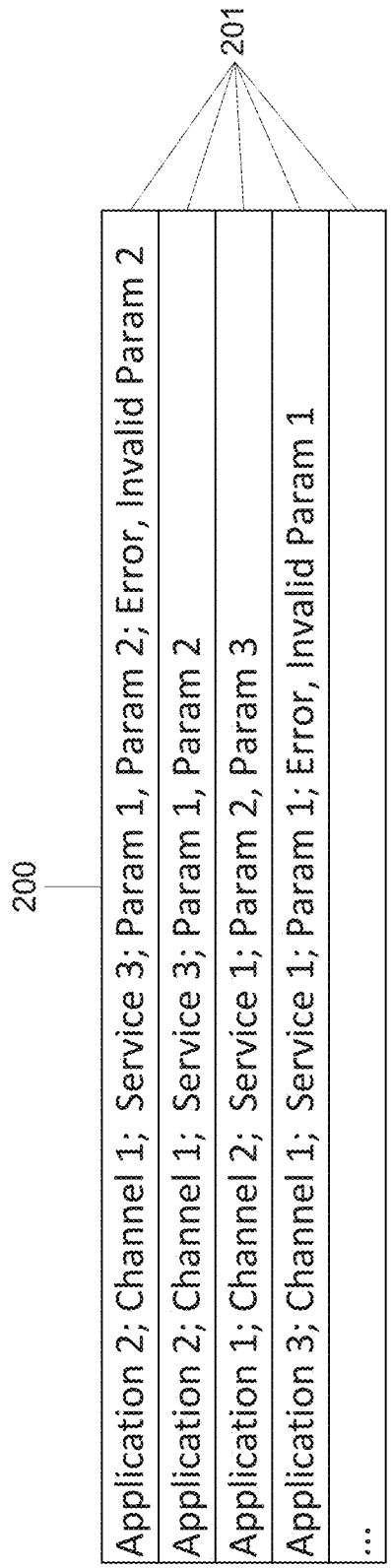
FIG. 2 illustrates an example user transaction log according to an embodiment.

In an embodiment, a log of user transactions may be stored. FIG. 2 illustrates an example of a log of user transactions according to an embodiment. FIG. 2 comprises log 200 and log entries 201. A user transaction may comprise of an application, a channel, a service, one or more parameters, and any errors that may have resulted from the transaction. An application may comprise the name of an application that, for example, uses one or more APIs. Log entries 201 show example applications, such as application 1, application 2 and application 3. A channel may comprise of a user that submitted that request, such as an entity that submitted a user request. Log entries 201 show example channels, such as channel 1 and channel 2. A service may comprise of a particular service for an application, for example a particular service specified by a particular API. Log entries 201 show example services, such as service 1 of application 1, service 1 of application 3, and service 3 of application 2. Parameters may comprise parameters that were passed with the transaction, such as parameters that were passed with an API call. Log entries 201 show example parameters, such as param 1 and param 2 for service 3 of application 2, param 2 and param 3 for service 1 of application 1, and param 1 for service 1 of application 3. An error may comprise of a particular error generated by a request, for example an error thrown by an API call not formatted in accordance with the API. An error may comprise of an invalid parameter or an invalid group of parameters. Log entries 201 show example errors, such as invalid param 1 and invalid param 2. In an embodiment, log 200 and log entries 201 may include additional information or may omit information.

Figure 3:
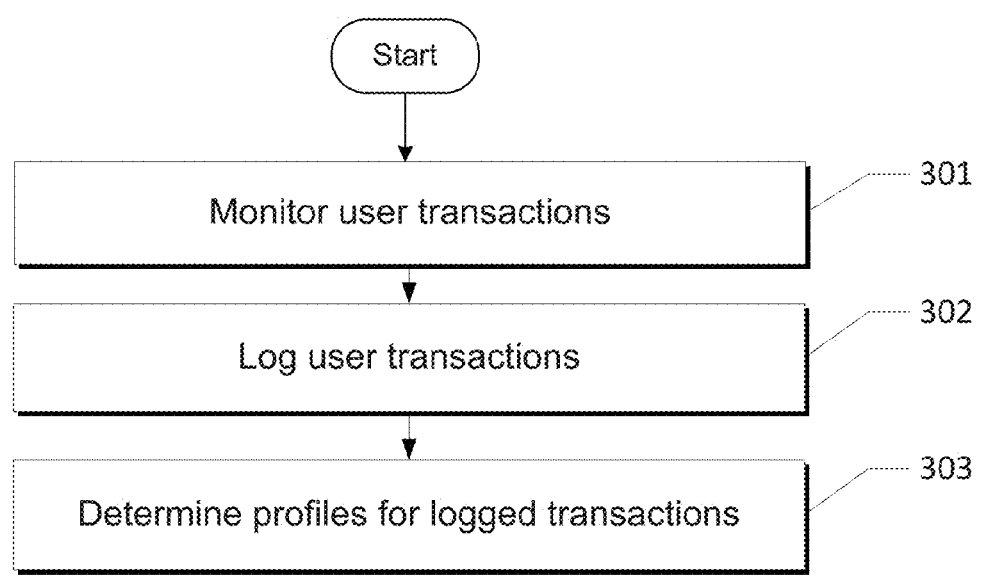
FIG. 3 illustrates an example process for determining profiles according to an embodiment.

In an embodiment, an organization, such as a financial institution, may service user requests from one or more entities such that a profile may be created. FIG. 3 illustrates an example process for creating a profile according to an embodiment. The process of FIG. 3 may begin at step 301, where user transactions are monitored. In an example, a user request that comprises an API call formatted in accordance with an API specification may be serviced and the transaction may be monitored. The monitoring may include monitoring user transactions for an application, a channel, a service, one or more parameters, and any errors that may have resulted from the transactions.

The process of FIG. 3 may proceed from step 301 to step 302, where user transactions may be logged. For example, a log such as log 200 of FIG. 2 may be generated based on monitored user transactions. In an embodiment, log entries may be stored for a predetermined duration of time such that log entries that occurred before the predetermined duration may be deleted, or log entries may be stored for an indefinite period of time.

The process of FIG. 3 may proceed from step 302 to step 303, where profiles are determined for the logged transactions. A profile may comprise of behavior tendencies for user transactions grouped by, for example, a particular application, a particular channel, and a particular service. In an embodiment, a user profile may be based on logged transactions over a predetermined period of time. A profile may also include error information for the grouped user transactions.

In an embodiment, a user profile may be determined for a particular application, channel, and service. For example, a profile may be determined for an application 2, channel 1, and service 3, where the profile is based on logged transactions for application 2, channel 1, and service 3 over a period of time. The period of time may be a day, a week, a month, or any other suitable period of time. In an example where service 1 comprises an API, the profile may include API specifications for service 1, such as parameters specifications for making an API call. In an embodiment, error information, such as an invalid parameter, may be stored. Error information may be stored for particular API specifications, such as for particular parameter combinations specified by an API. The error information may include an absolute number of errors, an error rate, or any other suitable value.

For example, an API may specify that service 1 may be called using one or more first parameter(s) or one or more second parameter(s). Error information may be stored such that logged errors that occurred when a user transaction passed the first parameter(s) are associated with the first parameter(s) in the profile and logged errors that occurred when a user transaction passed the second parameter(s) are associated with the second parameter(s) in the profile. Accordingly, a first analysis may be performed to calculate a number of errors and an error rate for user transactions that passed the first parameter(s) based on the logged transactions that passed the first parameter(s) and a second analysis may be performed to calculate a number of errors and an error rate for user transactions that passed the second parameter(s) based on the logged transactions that passed the second parameter(s). In this example, a determined profile will comprise a number of errors and an error rate for logged transactions that passed the first parameter(s) and a number of errors and an error rate for logged transactions that passed the second parameter(s).

FIG. 4 illustrates a portion of an example profile according to an embodiment. FIG. 4 illustrates a portion of a profile for logged transactions for application 2, channel 1, and service 3. In an embodiment, a profile may be stored in a data structure. The profile includes parameters column 401 and entries 405. Parameters column 401 may comprise parameters specified by service 3, for example an API service that specifies parameters for API calls. Entries 405 may comprise the various parameter combinations specified by service 3. In an example, FIG. 4 illustrates profile information for the parameters para 1 and para 2. Thus, the profile information may be determined based on logged user transactions for application 2, channel 1, and service 3 that passed para 1 and para 2 in a request. Similar profile information may be stored for the other parameter combinations of entries 405.

FIG. 4 illustrates error information for requests that passed the parameters para 1 and para 2. Column 204 may comprise of error names, column 403 may comprise of an absolute number of errors for each error name, and column 406 may comprise an error percentage for each error name. Entries 406 include an entry for each error name logged for para 1 and para 2. The errors names include invalid para 1 and invalid para 2. A count for invalid para 1 is 10 and an error rate is 1%. A count for invalid para 2 is 10 and an error rate is 1%.

In an embodiment, a profile may comprise of behavior tendencies for user transactions grouped by various other combinations. For example, the profile may comprise of behavior tendencies for user transactions grouped by a particular application and a particular service. In this example, a determined profile for a particular application and a particular service may be determined using transactions logged for all channels. In another embodiment, a profile may be based on a particular service, or any suitable combination of elements.

Figure 5:
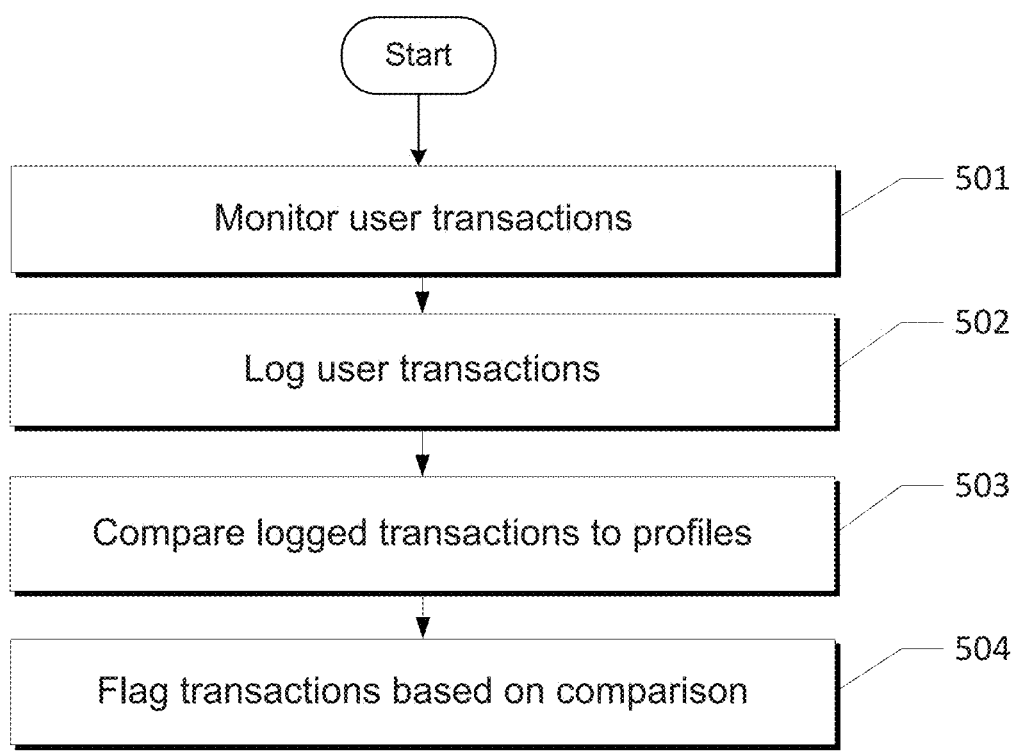
FIG. 5 illustrates an example process for comparing logged transactions to a profile according to an embodiment.

In an embodiment, an organization, such as a financial institution, may flag user transactions based on profiles. FIG. 5 illustrates an example process for flagging user transactions based on a determined profile according to an embodiment. One or more profiles may be determined prior to the process of FIG. 5, for example, using the process of FIG. 3. In an embodiment, the process of FIG. 3 is performed prior to the process of FIG. 5. The process of FIG. 5 may begin at step 501, where user transactions are monitored. In an example, a user request that comprises an API call formatted in accordance with an API specification may be serviced and the transaction may be monitored. The monitoring may include monitoring user transactions for an application, a channel, a service, one or more parameters, and any errors that may have resulted from the transactions.

The process of FIG. 5 may proceed from step 501 to step 502, where user transactions may be logged. For example, a log such as log 200 of FIG. 2 may be generated based on monitored user transactions. In an embodiment, log entries may be stored for a predetermined duration of time such that log entries that occurred before the predetermined duration may be deleted, or log entries may be stored for an indefinite period of time.

Figure 6:
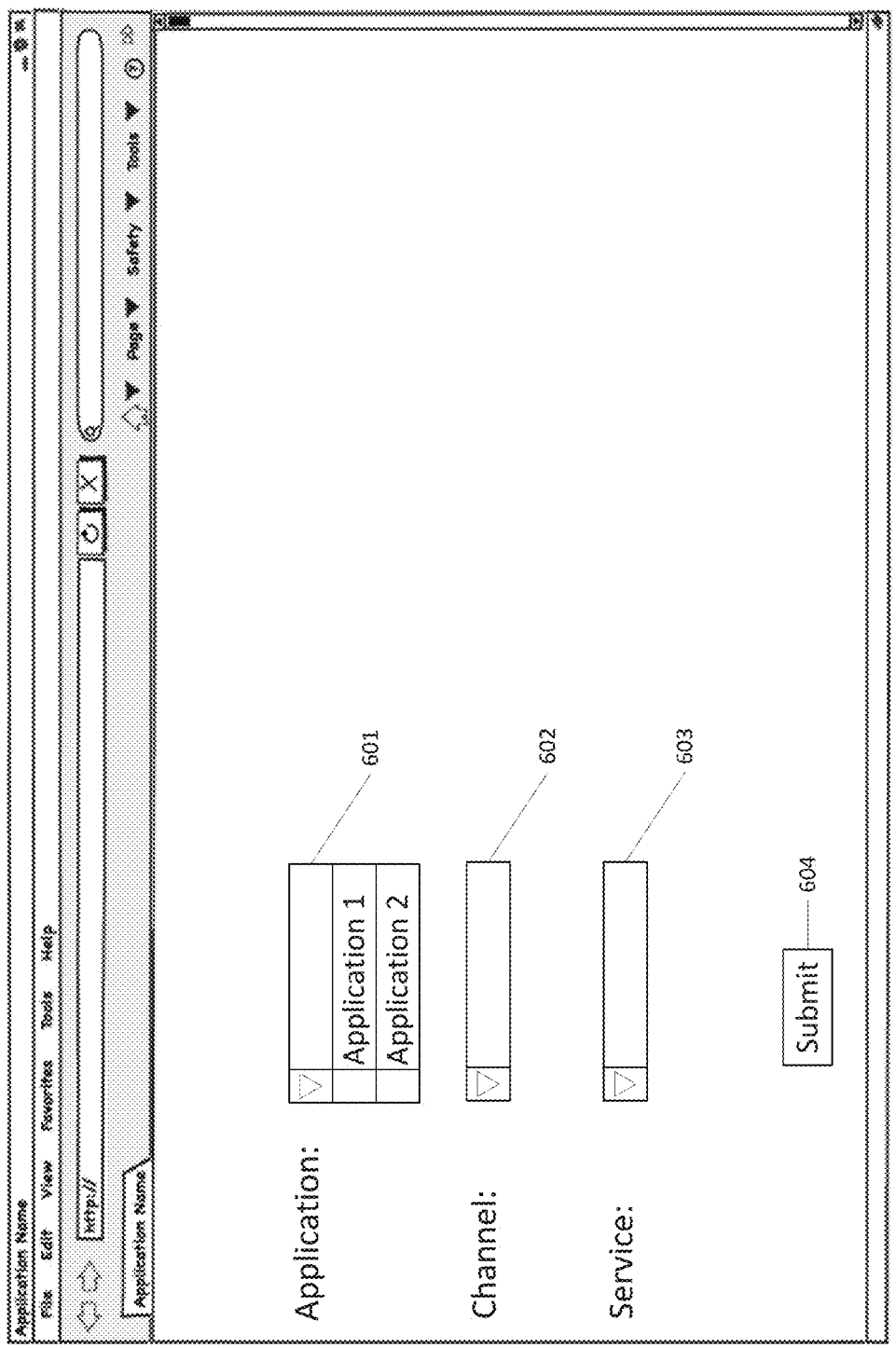
FIGS. 6-10 illustrate example interfaces for comparing logged transactions to a profile according to an embodiment.
Figure 7:
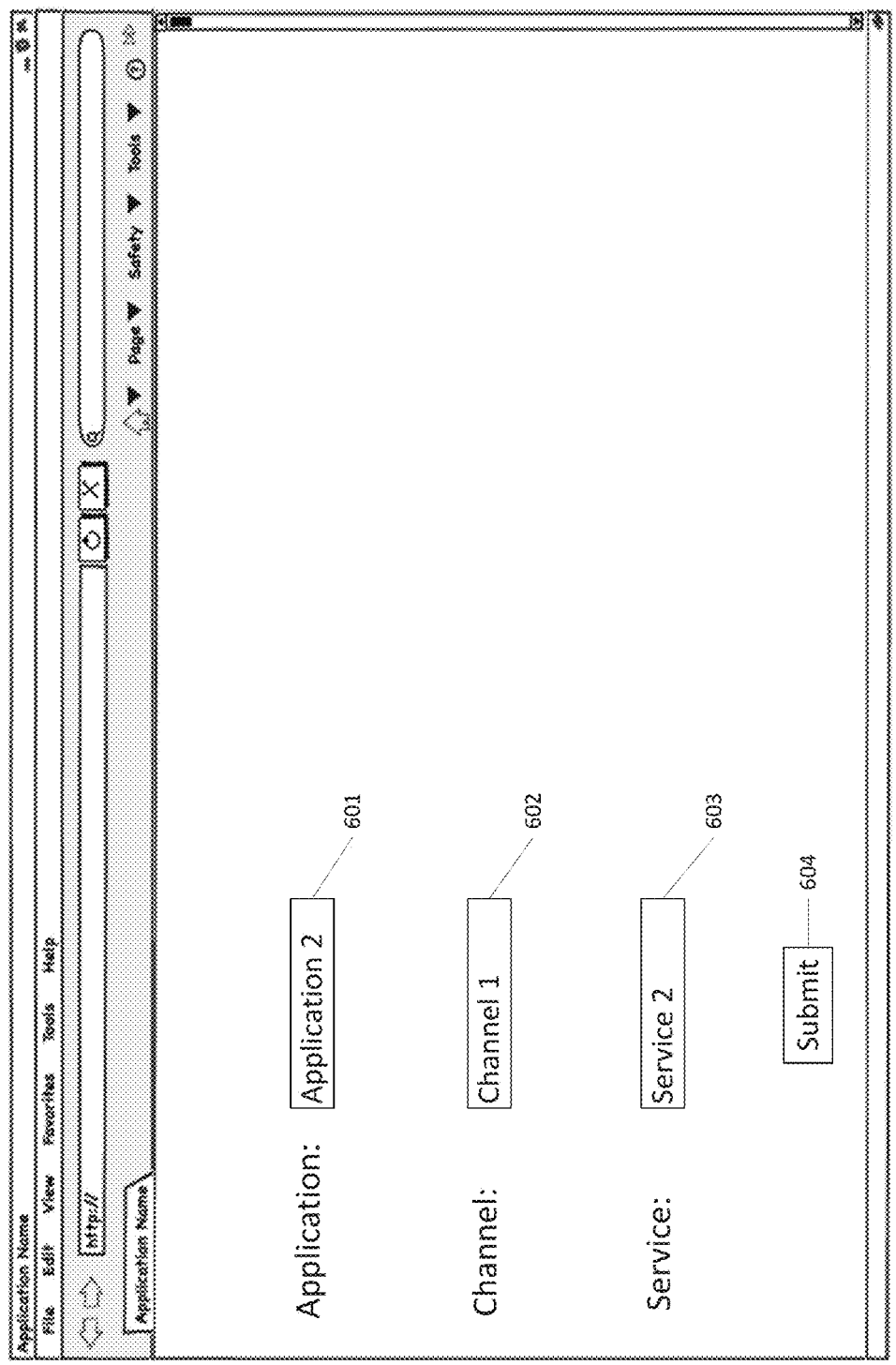
Figure 8:
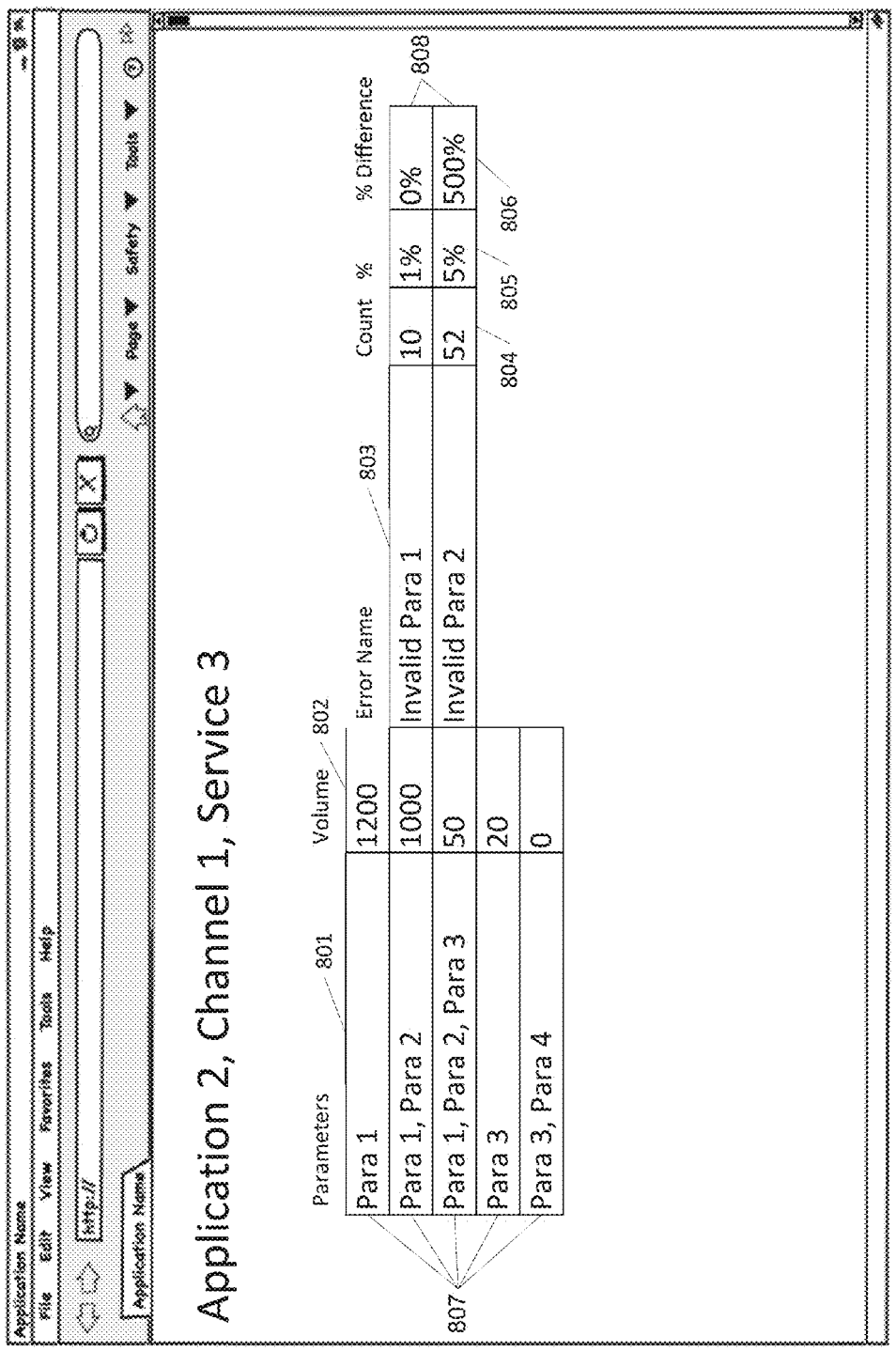

The process of FIG. 5 may proceed from step 502 to step 503, where the logged user transactions may be compared to profiles. For example, transactions logged for a particular application, a particular channel, and a particular service may be compared to a profile determined for the particular application, particular channel, and particular service. FIGS. 6-8 illustrate an interface that may be implemented to compare logged user transactions to profiles according to an embodiment. One or more webpages such as that illustrated in FIGS. 6-8 may be used to implement an embodiment. A webpage may leverage a number of web technologies in order to implement an embodiment, such as HTML, CSS, Java-script, AJAX, J2EE, .NET, and any other suitable technology. The webpage may include one or more forms, such as an input field, a text field, a drop down menu, a button, a slider, or any other suitable form. The webpage may further include an applet or any other type of suitable web application. In an embodiment, FIGS. 6-8 may be implemented in a standalone application with suitable user interface elements.

FIGS. 6 and 7 illustrate web pages for entering user transaction information according to an embodiment. For example, FIG. 6 includes drop down menu 601, for entering a particular application, drop down menu 602, for entering a particular channel, and drop down menu 603, for entering a particular service. FIG. 6 also comprises a submit button for submitting a request after entering information in drop down menus 601, 602 and 603.

In an embodiment, drop down menus 602 and 603 may be dynamic. For example, after selecting a particular application from drop down menu 601, the channels for that application may be populated in drop down menu 602 and the services for that application may be populated in drop down menu 603. FIG. 7 illustrates an example where drop down menus 601, 602, and 603 have been used to select application 2, channel 1, and service 2. Submit button 604 may be used to submit this user transaction information.

FIG. 8 illustrates a web page for comparing logged user transactions to a profile. For example, FIG. 8 illustrates comparing logged transaction information for application 2, channel 1, and service 3 to a profile determined for application 2, channel 1 and service 3. For example, the profile may be similar to the profile illustrated in FIG. 4. The logged transactions for application 2, channel 1, and service 3 compared to the profile may be transactions over a period of time, for example, one day, one week, or any other suitable period of time.

In an embodiment, user transactions may be displayed using column 801 and column 802. Column 801 may display parameter(s) and column 802 may display a volume for transactions using particular parameter(s). Parameters column 801 may comprise parameter(s) specified by service 3, for example an API service that specifies parameter(s) for API calls. Entries 807 may comprise the various parameter combinations specified by service 3. Column 802 may display the volume of transactions that passed the particular parameter(s) in each respective row.

In an example, FIG. 8 displays a comparison between logged transactions and a determined profile for the parameters para 1 and para 2. Thus, the logged transactions for application 2, channel 1, and service 3 that passed para 1 and para 2 are compared against a profile determined for application 2, channel 1, service 3, and passed para 1 and para 2. Similar comparisons may be displayed for entries 807. For example, each entry 807 may be clickable, where clicking an entry displays a comparison for that entry.

In an embodiment, FIG. 8 displays a comparison using columns 803, 804, 805, and 806. Column 803 displays error names for any error contained in the logged transactions being compared. Entries 808 display errors for invalid para 1 and invalid para 2. Column 804 displays an absolute number of errors contained in the logged transactions being compared for the particular error in the respective row. Column 805 displays an error rate for the logged transactions being compared for the particular error in the respective row. Column 806 displays a difference between the error rate for the logged transactions being compared and an error rate contained in the profile being compared for the particular error in the respective row. In an example, for error invalid para 1, the logged transactions being compared included 10 errors and this comprised an error rate of 1%. When the error rate of 1% was compared to the profile error rate for invalid para 1, the comparison resulted in a difference of 0%. In another example, for error invalid para 2, the logged transactions being compared included 50 errors and this comprised an error rate of 5%. When the error rate of 5% was compared to the profile error rate for invalid para 1, the comparison resulted in a difference of 500%. For example, the profile error rate for invalid para 1 may be 1%. Accordingly, the difference been 1% and 5% may be calculated as 500%, or 0.05/0.01=5.0. A difference in error rates or a difference in volume rates, as described below, may be calculated in a similar manner.

In an embodiment, column 806 may be calculated based on the difference between a base error rate and the error rate logged in the transactions, displayed in column 805. The base error rate may, by default, be the profile error rate. An embodiment will be described below where the base error rate may be edited.

The process of FIG. 5 may proceed from step 503 to step 504, where transactions are flagged based on the comparison. For example, in column 806 of FIG. 8, the difference between the error rate contained in the logged transactions being compared and the profile being compared for error invalid para 1 is displayed as 0% and the difference between the error rate contained in the logged transactions being compared and the profile being compared for invalid para 2 is displayed as 500%. In an embodiment, an entry may be flagged if a difference in error rate for that entry is greater than a threshold. For example, the entry 808 corresponding to error invalid para 2 may be flagged based on the 500% difference being greater than a threshold. The flag may comprise an indicator, such as a visual indicator. For instance, a flagged entry may include highlighting in a color, such as red, yellow, or the like, or may have a graphic displayed near the entry. Entries may be highlighted according to a configuration illustrated in FIG. 9.

In an embodiment, steps 503 and 504 of FIG. 5 may be performed at a different point in time than steps 501 and 502. For example, user transactions may be monitored and logged, according to steps 501 and 502, at one point in time, and the transactions may be compared to profiles and flagged, according to steps 503 and 504, at another point in time.

Figure 9:
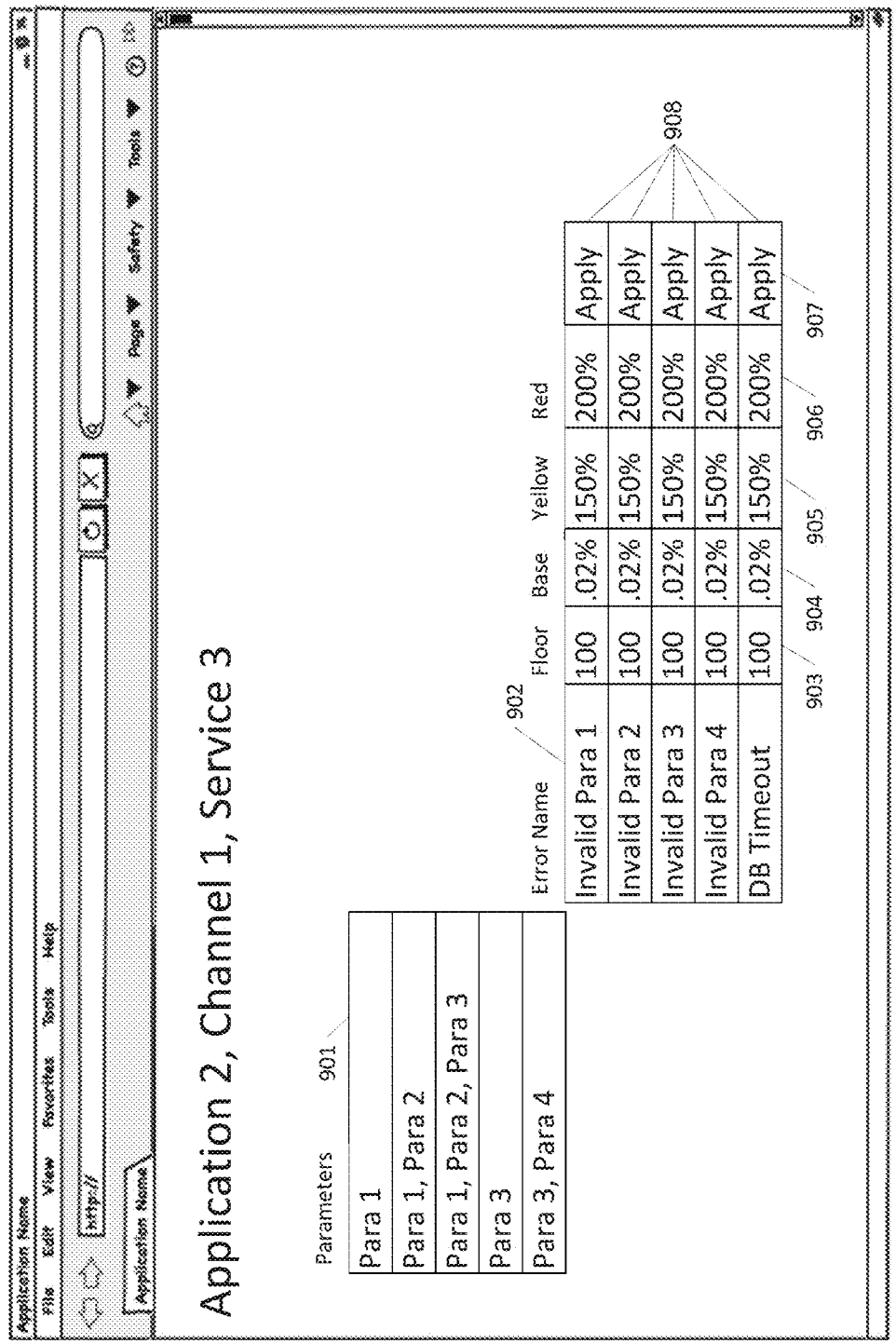

FIG. 9 illustrates an interface that may be implemented to configure a comparison between logged transactions and a profile according to an embodiment. One or more webpages such as that illustrated in FIG. 9 may be used to implement an embodiment. A webpage may leverage a number of web technologies in order to implement an embodiment, such as HTML, CSS, Java-script, AJAX, J2EE, .NET, and any other suitable technology. The webpage may include one or more forms, such as an input field, a text field, a drop down menu, a button, a slider, or any other suitable form. The webpage may further include an applet or any other type of suitable web application. In an embodiment, FIG. 9 may be implemented in a standalone application with suitable user interface elements.

FIG. 9 illustrates a web page for configuring a comparison between logged transactions and a profile according to an embodiment. For example, the comparison configured in FIG. 9 comprises a comparison between logged transactions and a profile for application 2, channel 1, and service 3. Parameters column 901 may display parameter(s) specified by service 3, for example an API service that specifies parameter(s) for API calls. Error name column 902 may display possible errors that may be generated using service 3. For example, service 3 allows for combinations of para 1, para 2, para 3, and para 4 to be passed in an API call. Accordingly, possible errors displayed in column 902 may include invalid para 1, invalid para 2, invalid para 3, invalid para 4, or DB timeout. Entries 908 correspond to each possible error. These are mere example errors and any other suitable error may be included. Floor column 903 may be editable by a user, and may display a floor threshold for a particular error. For example, a floor threshold of 100 may indicate that a particular entry for an error will not be flagged unless an absolute number of errors is at least 100. In an embodiment, base column 904 may be editable by a user, and may display a base for a particular error rate that is used to calculate the difference in error rate for the logged transactions. As such, column 806 of FIG. 8 may be calculated based on a difference between column 805 of FIG. 8 and the base error rate. In an example, a base error may comprise the profile error rate by default. In another example, the base error rate may be edited. Yellow column 905 may be editable by a user, and may display a threshold difference for a particular error to be flagged using yellow highlighting. For example, a threshold difference of 150% may indicate that a particular entry for an error will be flagged when a difference between an error rate for user transactions being compared and a profile being compared is at least 150%. Red column 906 may be similar to yellow column 905, but may configure a particular error to be flagged using red highlighting. Entries 908 include apply buttons in column 907. One or more of columns 903-907 may be edited for an entry and the corresponding apply button may be clicked to apply the new configuration data.

Figure 10:
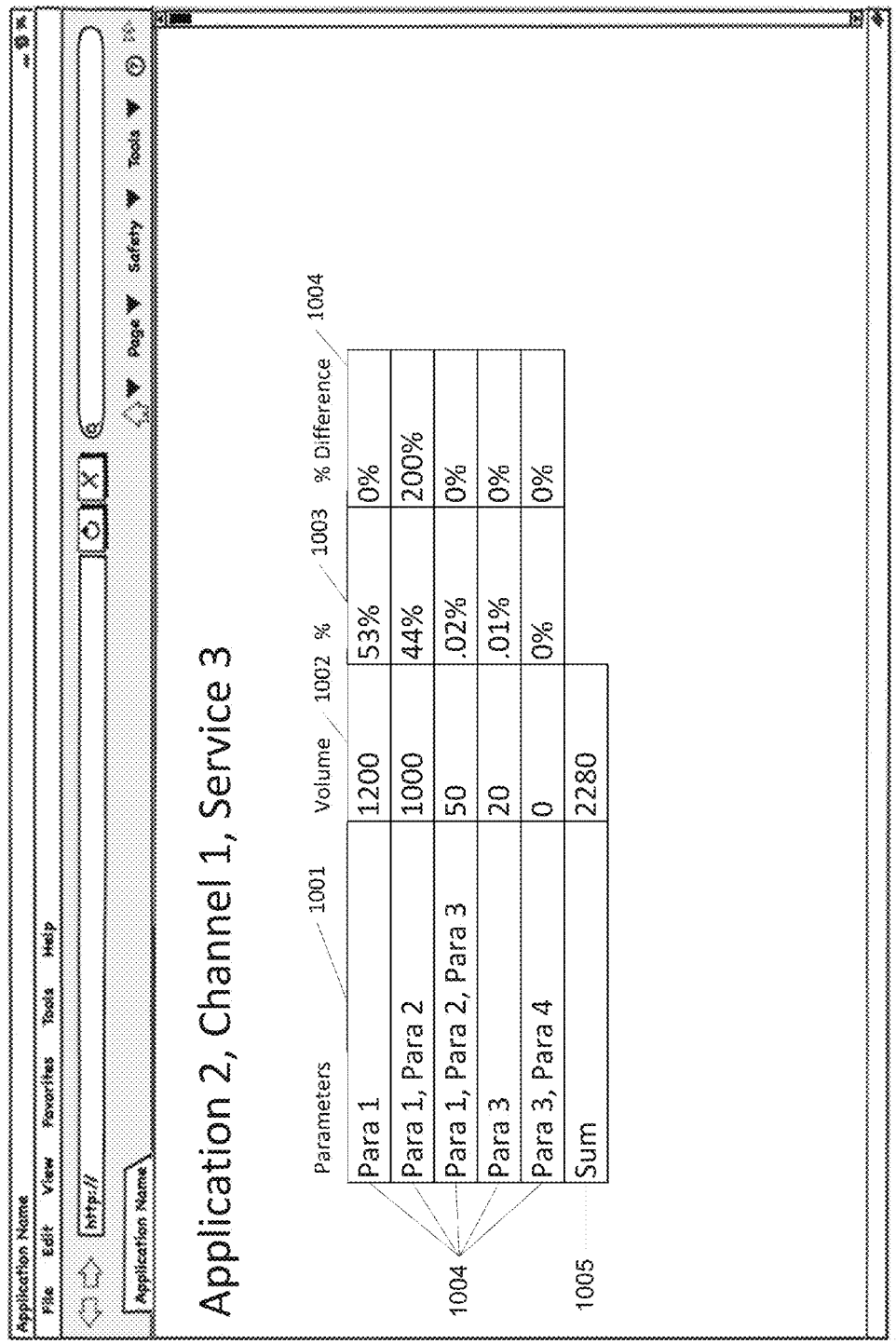

In an embodiment, a comparison between logged transactions and a determined profile, such as the comparison displayed in FIG. 8, may also comprise highlighting transactions based on a difference in volume. For example, step 503 of FIG. 5 may further comprise comparing logged transactions to profiles based on a volume and step 504 may further comprise flagging transactions based on the compared volume. FIG. 10 displays a comparison between logged transactions and a determined profile for Application 2, Channel 1, and Service 3.

In an embodiment, FIG. 10 displays a comparison using columns 1001, 1002, 1003, and 1004. Column 1001 displays parameter(s) and column 1002 displays a volume for transactions using particular parameter(s). Parameters column 1001 may comprise parameter(s) specified by service 3, for example an API service that specifies parameter(s) for API calls. Entries 1004 may comprise the various parameter combinations specified by service 3. Column 1002 displays the volume of transactions that passed the particular parameter(s) in each respective row. Entry 1005 may display a total sum of transactions that called the service, such as a sum of API calls for the service using any of parameter(s) combinations from entries 1004. Column 1003 displays a rate for the logged transactions being compared for the particular parameter(s) in the respective row. For example, column 1003 may be calculated based on a volume for the parameter(s), displayed in column 1002 for the particular parameter(s), compared against a sum for all transactions for the particular service, displayed in column 1002 for entry 1005. Column 1004 displays a difference between a volume for the logged transactions being compared and a volume contained in the profile being compared for the particular parameter(s) in the respective row.

In an example, for para 1, the logged transactions being compared included a volume of 1200 and this comprised a rate of 53%. When the rate of 53% was compared to the profile rate for para 1, the comparison resulted in a difference of 0%. In another example, for para 2, the logged transactions being compared included a volume of 1000 and this comprised a rate of 44%. When the rate of 44% was compared to the profile rate for para 2, the comparison resulted in a difference of 200%. For example, the profile rate for para 1 may be 22%. Accordingly, the difference been 22% and 44% may be calculated as 200%, or 0.02/0.01=2.0. A difference in error rates or a difference in volume rates, as described below, may be calculated in a similar manner.

In an embodiment, an entry may be flagged if a difference in volume for that entry is greater than a threshold. For example, flagging for entries based on volume may be similar to flagging for entries based on error rate, as described above. The entry for para 2 may be flagged based on the 200% difference being greater than a threshold. The flag may comprise an indicator, such as a visual indicator. For instance, a flagged entry may include highlighting in a color, such as red, yellow, or the like, or may have a graphic displayed near the entry.

In an embodiment, flagging transactions based on a difference in volume may be configured similar to the configuration illustrated in FIG. 9. For example, a floor, base, yellow threshold, and red threshold for a difference in volume may be configured for particular parameter(s) combinations.

In an embodiment, the above methods and system may be implemented in a production environment. For example, a server such as server 164 of FIG. 1B may be implemented by an organization and may perform the methods described above. Server 164 may be connected to various entities that work with the organization, divisions within the organization, or individuals, such as bank customers, that submit user requests.

In another embodiment, the above methods and system may be implemented in a testing environment. For example, a testing server may be implemented by an organization and may perform the methods described above. The testing server may be connected to one or more testing computing devices that submit user requests. In this example, a profile compared to logged user transactions may be a profile determined in a production environment. Accordingly, in an embodiment, a server in a production environment may perform the method steps of FIG. 3 and a server in a testing environment may perform the method steps of FIG. 5. In an embodiment, a testing server may be connected to one or more entities in a production environment that submit user requests to the testing server. For example, a testing server may implement a change to an existing system, and the testing server may service user requests from entities in a production environment in order to determine how the changes may affect services offered, such as web services.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer implemented method, comprising:
   at a first time:
   receiving, at a computing device, a plurality of user requests, wherein the first user requests include one or more parameters;
   servicing the first user requests, wherein a least a portion of the first user requests generate errors when serviced; and
   determining profiles for serviced first user requests, wherein the profiles are determined based on the parameters included in the first user requests and for a plurality of groups of serviced first user requests, the serviced first user requests being grouped based on parameters for each serviced first user request, and wherein the profiles include an error rate for the groups of serviced first user requests;
   at a second time:
   receiving a second plurality of user requests, wherein the second user requests include one or more parameters;
   servicing the second user requests, wherein a least a portion of the second user requests generate an error when serviced;
   logging the serviced second user requests, wherein the logging includes the parameters included in the second user requests;
   comparing the logged serviced second user requests to the profiles determined based on the serviced first user requests by comparing an error rate for the logged service second user requests to an error rate for the determined profiles; and
   flagging a portion of the serviced second user requests based on the comparison.

2. A method of claim 1, wherein determining profiles for serviced first user requests further comprises:
   logging the serviced first user requests, wherein the logging includes the parameters included in the first user requests and the errors generated by a portion of the serviced first user requests; and
   determining profiles for serviced first user requests based on the logging.

3. A method of claim 1, wherein flagging a portion of the serviced second user requests based on the comparison comprises flagging the portion of serviced second user requests when the difference between an error rate for the portion of second serviced requests and an error rate for the determined profiles is above a threshold.

4. A method of claim 1, further comprising:
   displaying a portion of the serviced second user requests; and
   displaying flagged serviced second users requests with an indicator.

5. A method of claim 1, wherein the plurality of first user requests and the plurality of second user requests comprise application programming interface (API) calls.

6. A method of claim 5, wherein the indicator comprises highlighting the flagged serviced second user requests.

7. A method of claim 1, wherein the parameters included in the first user requests comprise parameters for an API call and the parameters included in the second user requests comprise parameters for an API call.

8. A system, comprising:
   a computing device, with a processor, a memory, and a display, wherein the computing device is configured to:
   at a first time:
   receive a plurality of user requests, wherein the first user requests include one or more parameters;
   service the first user requests, wherein a least a portion of the first user requests generate errors when serviced; and
   determine profiles for serviced first user requests, wherein the profiles are determined based on the parameters included in the first user requests and for a plurality of groups of serviced first user requests, the serviced first user requests being grouped based on parameters for each serviced first user request, and wherein the profiles include an error rate for the groups of serviced first user requests;
   at a second time:
   receive a second plurality of user requests, wherein the second user requests include one or more parameters;
   service the second user requests, wherein a least a portion of the second user requests generate an error when serviced;
   log the serviced second user requests, wherein the logging includes the parameters included in the second user requests;
   compare the logged serviced second user requests to the profiles determined based on the serviced first user requests by comparing an error rate for the logged service second user requests to an error rate for the determined profiles; and
   flag a portion of the serviced second user requests based on the comparison.

9. A system of claim 8, wherein determining profiles for serviced first user requests further comprises:
   logging the serviced first user requests, wherein the logging includes the parameters included in the first user requests and the errors generated by a portion of the serviced first user requests; and
   determining profiles for serviced first user requests based on the logging.

10. A system of claim 9, wherein flagging a portion of the serviced second user requests based on the comparison comprises flagging the portion of serviced second user requests when the difference between an error rate for the portion of second serviced requests and an error rate for the determined profiles is above a threshold.

11. A system of claim 10, wherein the computing device is further configured to:
    display a portion of the serviced second user requests; and
    display flagged serviced second users requests with an indicator.

12. A system of claim 11, wherein the indicator comprises highlighting the flagged serviced second user requests.

13. A system of claim 12, wherein the plurality of first user requests and the plurality of second user requests comprise application programming interface (API) calls.

14. One or more non-transitory computer readable media having stored thereon instructions that, when executed by an apparatus, cause the apparatus to:
at a first time:
receive a plurality of user requests, wherein the first user requests include one or more parameters;
service the first user requests, wherein a least a portion of the first user requests generate errors when serviced; and
determine profiles for serviced first user requests, wherein the profiles are determined based on the parameters included in the first user requests and for a plurality of groups of serviced first user requests, the serviced first user requests being grouped based on parameters for each serviced first user request, and wherein the profiles include an error rate for the groups of serviced first user requests;
at a second time:
receive a second plurality of user requests, wherein the second user requests include one or more parameters;
service the second user requests, wherein a least a portion of the second user requests generate an error when serviced;
log the serviced second user requests, wherein the logging includes the parameters included in the second user requests;
compare the logged serviced second user requests to the profiles determined based on the serviced first user requests by comparing an error rate for the logged service second user requests to an error rate for the determined profiles; and
flag a portion of the serviced second user requests based on the comparison.

* * * * *